US009815410B2

(12) United States Patent
Henion et al.

(10) Patent No.: US 9,815,410 B2
(45) Date of Patent: Nov. 14, 2017

(54) SIDE MIRROR ASSEMBLY WITH STATIONARY CAMERA AND TELESCOPING MIRROR HEAD

(71) Applicant: SMR Patents S.A.R.L., Luxembourg (LU)

(72) Inventors: Paul Henion, Port Huron, MI (US); Darryl Brooks, Romeo, MI (US); Gary Sinelli, Birmingham, MI (US)

(73) Assignee: SMR Patents S.A.R.L., Luxembourg (LU)

( * ) Notice: Subject to any disclaimer, the term of this patent is extended or adjusted under 35 U.S.C. 154(b) by 952 days.

(21) Appl. No.: 14/013,378

(22) Filed: Aug. 29, 2013

(65) Prior Publication Data

US 2014/0063233 A1 Mar. 6, 2014

Related U.S. Application Data

(60) Provisional application No. 61/694,293, filed on Aug. 29, 2012.

(51) Int. Cl.
*B60R 1/12* (2006.01)
*B60R 1/00* (2006.01)
*B60R 1/078* (2006.01)

(52) U.S. Cl.
CPC .............. *B60R 1/003* (2013.01); *B60R 1/078* (2013.01); *B60R 1/12* (2013.01); *B60R 2001/1253* (2013.01)

(58) Field of Classification Search
CPC .................................................... B60R 1/003
See application file for complete search history.

(56) References Cited

U.S. PATENT DOCUMENTS

| 5,813,717 | A  | * | 9/1998  | Wilson ................... B60J 3/0282 296/97.5 |
|-----------|----|---|---------|--------|
| 6,511,189 | B1 |   | 1/2003  | Henion et al. |
| 7,748,857 | B2 |   | 7/2010  | Fimeri et al. |
| 2002/0003571 | A1 | * | 1/2002 | Schofield ................ B60C 23/00 348/148 |
| 2003/0103142 | A1 | * | 6/2003 | Hitomi .................... B60R 1/074 348/148 |
| 2003/0193613 | A1 | * | 10/2003 | Matko ...................... B60R 1/00 348/375 |

(Continued)

FOREIGN PATENT DOCUMENTS

DE  WO 2011085745 A1 * 7/2011 ............. B60R 11/04

*Primary Examiner* — Jamie Atala
*Assistant Examiner* — Hesham Abouzahra
(74) *Attorney, Agent, or Firm* — MacMillan, Sobanski & Todd LLC

(57) ABSTRACT

A rear-view side mirror assembly includes a base for attachment to a vehicle, one or more support arms extending from the base, and a mirror head attached to the support arm and configured for telescoping movement along the support arm. A camera is fixedly attached to the support arm so as to remain stationary relative to the mirror base and vehicle as the mirror head telescopes inward and outward. An elongated aperture in the mirror head housing ensures that the camera lens is not occluded as the mirror head telescopes between a retracted position and an extended position. A flexible track covers portions of the elongated aperture on alternate sides of the lens as the housing telescopes relative to the lens.

20 Claims, 4 Drawing Sheets

(56) References Cited

U.S. PATENT DOCUMENTS

| | | | |
|---|---|---|---|
| 2004/0246608 A1* | 12/2004 | Wellington | B60R 1/078 359/877 |
| 2005/0200988 A1 | 9/2005 | Olijnyk et al. | |
| 2010/0110188 A1* | 5/2010 | Brester | B60R 1/00 348/148 |
| 2013/0302024 A1* | 11/2013 | Eckert | G03B 17/561 396/427 |
| 2014/0063245 A1 | 3/2014 | Bowers et al. | |

* cited by examiner

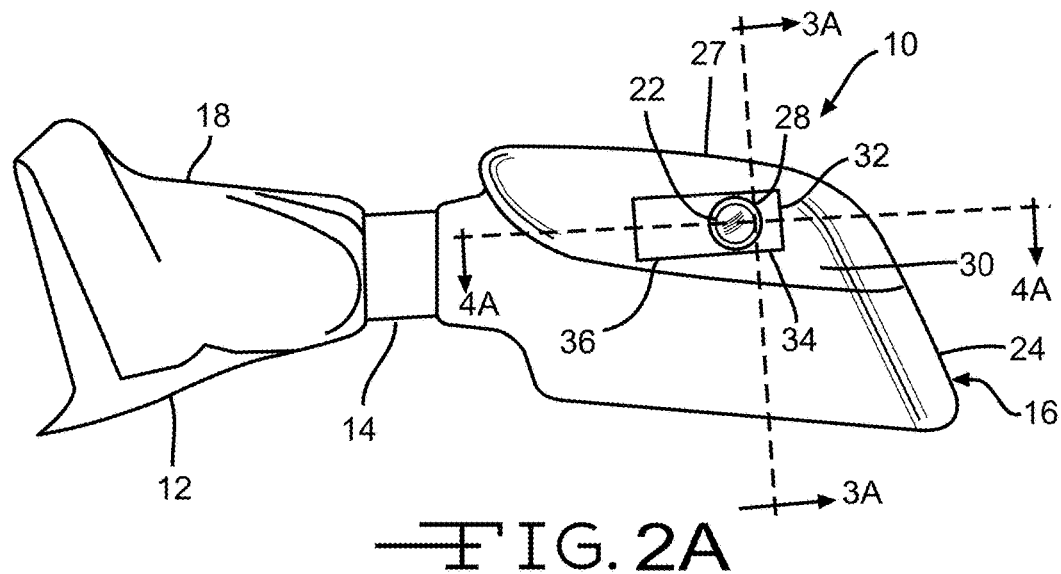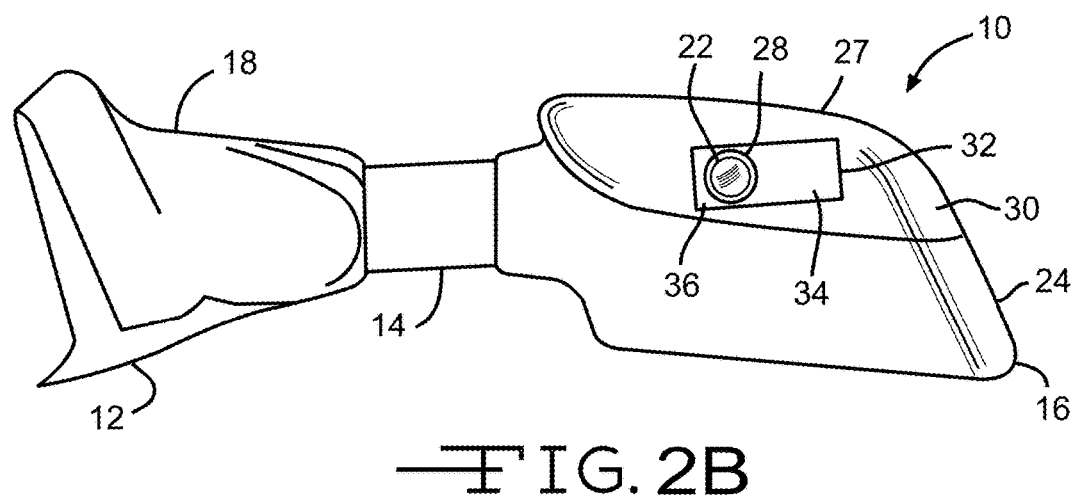

SIDE MIRROR ASSEMBLY WITH STATIONARY CAMERA AND TELESCOPING MIRROR HEAD

This application claim priority from U.S. provisional application Ser. No. 61/694,293, filed Aug. 29, 2012, which is incorporate herein.

BACKGROUND

Certain vehicles are equipped with structures such as tow bars and the like to tow trailers, campers, boats, mobile homes, etc. Sometimes the towed vehicles are so wide that typical side view mirrors do not extend far enough from the vehicle to allow the vehicle operator to see around the towed vehicle. Accordingly, it is known to equip the towing vehicle with side view mirrors that can extend, in a telescoping manner, from a retracted position that is relatively close to the vehicle to an extended position sufficient to allow the vehicle operator to adequately see around the towed vehicle.

In certain embodiments, the towing vehicle can be equipped with cameras designed to enhance the view of the vehicle operator of hard-to-see areas around the periphery of the vehicle. In some embodiments, the cameras can be incorporated into the side view mirrors and configured to provide views of the sides of the vehicles.

It would be advantageous if telescoping side view mirrors incorporating cameras could be improved.

SUMMARY OF THE INVENTION

In a first aspect, the invention relates to a rear-view side mirror assembly for attachment to a vehicle, the side mirror assembly comprising:

one or more support arms attached to and extending from a mirror base assembly configured for attachment to a portion of a vehicle;

a mirror head attached to the one or more support arms such that the mirror head can telescope relative to the mirror base; and a camera positioned within the mirror head and attached to the one or more support arms, the camera configured to provide images exterior to the vehicle, wherein the camera is configured to remain in a stationary position relative to the mirror base as the mirror head telescopes.

The mirror head is configured to telescope along a portion of the support arms between the extremes of a fully retracted position and a fully extended position, including any intermediate position between the extremes. There may be one or more cameras positioned in the mirror head and the camera may be directed to view generally downward and outward from the vehicle.

In some embodiments, the mirror head has aperture, such as an elongated aperture, to provide a viewing port for a lens of the camera regardless of the telescoped position of the mirror head. The aperture may be generally rectangular, trapezoidal, oval or elliptical in shape.

In some embodiments, the mirror head further comprises a flexible track configured to cover a portion of the elongated aperture adjacent the camera lens regardless of the telescoped position of the mirror head. The track may be held in position by one or more track guides, which may be part of a larger track guide assembly and may be in opposing positions to thus form a channel, such as a U-shaped channel to guide the flexible track. In some embodiments, free ends of the flexible track merely flex into and out of the mirror head housing, while in other embodiments, the flexible track forms a continuous band and has no free ends.

In another aspect, the invention relates to a vehicle having a mirror assembly as described above mounted to the side of the vehicle. The vehicle may be a towing vehicle, wherein the telescoping mirror better allows occupants of the vehicle to see around a large towed load.

BRIEF DESCRIPTION OF THE DRAWINGS

FIG. 2A is a bottom view of the telescoping side view mirror assembly of FIG. 1 illustrating the camera with a mirror head in a retracted position.

FIG. 2B is a bottom view of the telescoping side view mirror assembly of FIG. 1 illustrating the camera with a mirror head in an extended position.

DETAILED DESCRIPTION OF THE INVENTION

Figure 1:
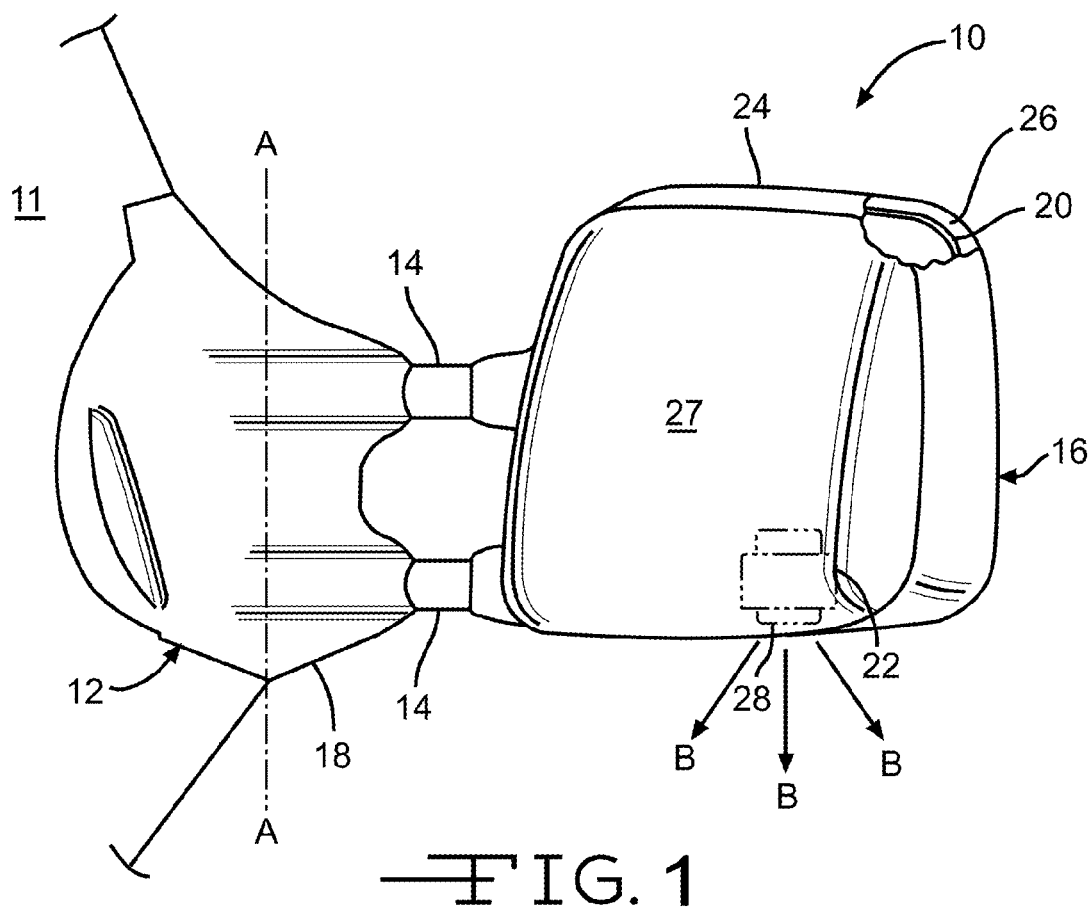
FIG. 1 is a perspective view of a telescoping side view mirror assembly incorporating a camera.

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

The description and figures disclose a side view mirror assembly (hereafter "mirror assembly") having a camera with a fixed position relative to a telescoping mirror head. Generally, the camera is positioned within the mirror head in a fixed position relative to the side of the vehicle as the mirror head telescopes from a retracted position to an extended position. The term "side view mirror", as used herein, is defined to mean an assembly attached to the vehicle and which permits the vehicle operator to adequately see around the towed vehicle. The assembly includes a mirror head, one or more support arms and a mirror base assembly. This definition of side view mirror is intended to include those embodiments wherein the side view mirror is attached to any portion of the vehicle. The term "mirror head", as used herein, is defined to mean an assembly including a housing, a scalp, a mirror and devices for rotating the mirror. The term "support arms", as used herein, is defined to mean structures configured to extend the mirror head from the side of a vehicle. The term "mirror base assembly", as used herein, is defined to mean one or more structures configured to attach the mirror head and support arms to the side of a vehicle. The terms "telescopes" or "telescoping," as used herein, is defined to mean the movement of the mirror head relative to the vehicle generally along the axis of the support arms, typically although not necessarily corresponding to an inboard or retracted position and an outboard or extended position.

Referring now to FIG. 1, a mirror assembly is shown generally at 10. The mirror assembly 10 is configured for installation on a vehicle 11. In certain embodiments, the mirror assembly 10 is configured for installation on a side door of the vehicle. However, it should be understood that in other embodiments the mirror assembly 10 can be installed on other portions of the vehicle, such as for example the non-limiting examples of the frame, quarter panels or fenders. The mirror assembly 10 is further configured to provide the occupants of the vehicle with a view extending to the rear of the vehicle. In certain embodiments, the mirror assembly 10 can optionally be configured as a break-away design, although it should understood that the mirror assembly 10 can be practiced without a break-away design.

The mirror assembly 10 includes a mirror base assembly 12, one or more support arms 14 and a mirror head 16. The mirror base assembly 12 and support arms 14 are known in the industry and therefore will only be briefly described herein.

The mirror base assembly 12 is configured to attach the support arms 14 and the mirror head 16 to a vehicle. In the illustrated embodiment, the mirror base assembly 12 includes a base structure (not shown) and a base cover 18. The base structure is configured to mount the support arms 14 to the vehicle. Any desired mechanism, device or structure, sufficient to mount the support arms 14 to the vehicle can be used. Optionally, the base structure can be configured such that the support arms 14 can pivot about a substantially vertical axis A-A (FIG. 1). However, it should be understood that the mirror assembly 10 can be practiced without pivoting of the support arms 14 about the axis A—A. In still other embodiments, the mirror assembly 10 can be configured to pivot about an axis that is not substantially vertical.

The base cover 18 is configured to cover the base structure with an aesthetically pleasing appearance that may or may not match the color and finish of the vehicle. Any desired base cover 18 can be used.

The support arm or arms 14 extend from the mirror base assembly 12 and are configured to connect the mirror base assembly 12 with the mirror head 16. In the illustrated embodiment, the support arms 14 are hollow and have an ovular cross-sectional shape. However in other embodiments, the support arms 14 can have other cross-sectional shapes, such as circular cross-sectional shapes, sufficient to connect the mirror base assembly 12 with the mirror head 16. In the illustrated embodiment, the support arms 14 have internal mechanisms and devices configured to retract and extend the mirror head 16 in a direction along a length of the support arms 14. However, it should be appreciated that in other embodiments, the mechanisms and devices for retracting and extending the mirror head 16 can be positioned in other locations, such as for example the non-limiting example of within the mirror head 16. Mechanisms and devices for telescoping the mirror head 16 relative to the base 12 and vehicle 11 are well known in the art and need not be described in detail herein. (See, e.g. U.S. Pat. No. 7,748,857 to Belcher, et al and assigned to SMR Patents S.A.R.L.)

While the embodiment shown in FIG. 1 illustrates a quantity of two support arms 14, it should be appreciated that in other embodiments a quantity of one support arm or more than two support arms can be used.

Referring again to FIG. 1, the mirror head 16 is configured for several functions. First, the mirror head 16 is configured to support a mirror 20. The mirror 20 will be discussed in more detail below. Second, the mirror head 16 is configured as an enclosure for devices and mechanisms arranged to initiate and control movement of the mirror 20 relative to the mirror head 16. Non-limiting examples of such devices and mechanisms include drive motors, rack and pinion gears and the like. Third, the mirror head 16 is configured for movement along the support arms 14, often from a retracted position to an extended position. In an extended position, the mirror head positions the mirror 20 for better vision around a wide towed vehicle. Fourth, the mirror head is configured as an enclosure for a camera 22. The camera 22 will be discussed in more detail below.

The mirror head 16 includes a housing 24. The housing 24 may be of any desired shape and includes various outer walls that merge together in a smooth manner such as to present a pleasing appearance. A rearward facing portion of the housing 24 is open and forms a cavity 26. The cavity 26 is configured to receive the mirror 20. The mirror 20 may be any suitable type, such as a flat, concave or convex mirror, or the type which automatically adjusts to reduce glare. A suitable shaped support member (not shown) is secured within the housing 24 and serves to movably support the mirror 20 within the cavity 26. The support member may include suitable mechanisms, such as drive motors and the like for remote control adjustment of the mirror 20, as well as various devices for heating the mirror 20 if desired. As thus far described, the mirror assembly 10 is typical to the existing mirror assemblies commonly employed on various vehicles.

Referring again to FIG. 1, a forward-facing, decorative scalp 27 is attached to the housing 24 and is configured to enclose the forward-facing portion of the housing 24. As with the base cover 18, the scalp 27 can have an aesthetically pleasing appearance that may or may not match the color and finish of the vehicle. The scalp 27 is configured to move with the mirror head 16, as the mirror head 16 moves along the support arms 14. The scalp 27 will be discussed in more detail below.

Referring again to FIG. 1, the mirror head 16 is further equipped with the camera 22. In the illustrated embodiment, the camera 22 is of the type to provide real-time digital images. However, in other embodiments, the camera 22 can provide other types of images. Optionally, the images from the camera 22 can be digitally combined with other images from other cameras to provide the vehicle occupants with a virtual "around-the-vehicle" view. While not shown in FIG. 1, power and image conducting cables 21 (see FIGS. 3A, 3B, 4A and 4B) can extend from the camera. In certain embodiments, the power and image conducting cables 21 can be ducted through the support arms 14 to controls located within the interior of the vehicle.

The camera 22 is positioned such that a viewing lens 28 is oriented in a direction to provide images in generally downward and outward directions as indicated by the direction arrows B. However, it should be appreciated that the camera 22 and the viewing lens 28 can be positioned in other orientations suitable to provide other images. It should also be appreciated that the camera 22 can be equipped with different types of lens to provide different desired visual effects or images. As non-limiting examples, the camera 22 can be equipped with a wide-angle or fish-eye lens suitable to provide desired peripheral images. While the embodiment illustrated in FIG. 1 illustrates a single camera 22, in other embodiments more than one camera may be positioned within the mirror head 16.

Referring again to FIG. 1 and as will be discussed in more detail below, the camera 22 is attached to the support arms 14 such that the camera 22 remains stationary relative to the side of the vehicle as the mirror head 16 telescopes along a length of the support arms 14, from a retracted position to an extended position or to intermediate positions.

Referring now to FIGS. 2A and 2B, a view of the bottom of the mirror assembly 10 is illustrated. As discussed above, the forward-facing scalp 27 is attached to the housing 24 of the mirror head 16. The scalp 27 includes a bottom portion 30. The bottom portion 30 of the scalp 27 includes an aperture 32. The aperture 32 is configured to provide the lens 28 of the camera 22 with a viewing port through the bottom portion 30 of the scalp 27 as the mirror head 16 moves along the support arms 14. In the illustrated embodiment, the aperture 32 has a rectangular cross-sectional shape. However, in other embodiments, the aperture 32 can have other cross-sectional shapes, such as for example an ovular cross-sectional shape, sufficient to provide the lens 28 of the camera 22 with a viewing port through the scalp 27 as the mirror head 16 moves in a telescoping manner relative to the camera 22, which remains in a fixed position relative to the support arms 14, the base unit 18 and the towing vehicle 11. The aperture 32 has a first end 34 and a second end 36, both of which will be discussed in more detail below.

Referring now to FIG. 2A, the mirror head 16 is shown in a retracted position. In a retracted position, the mirror head 16 is positioned along a length of the support arms 14 such as to be located relatively close to the vehicle (not shown). As a result of the retracted position of the mirror head 16, the camera 22 is positioned such that the lens 28 is exposed through the first end 34 of the aperture 32.

Referring now to FIG. 2B, the mirror head 16 is shown in an extended position. In an extended position, the mirror head 16 is positioned along a length of the support arms 14 such as to be further away from the vehicle (not shown) and allow the vehicle occupants to adequately see around the towed vehicle. As a result of the extended position of the mirror head 16, the camera 22 is positioned such that the lens 28 is exposed through the second end 36 of the aperture 32. The aperture 32 is generally elongated along an axis parallel to the support arms 14, but may take on any of alternative elongated shapes such as rectangular, trapezoidal, elliptical or oval.

While FIGS. 2A and 2B show the extreme positions of the lens 28 of the camera 22 relative to the aperture 32 as the mirror head 16 travels along the support arms 14, i.e., from a retracted position to an extended position, it should be appreciated that the mirror head 16 can have an infinite number of intermediate positions between the retracted position and the extended position. Accordingly, the aperture 32 is configured to provide the lens 28 of the camera 22 with a viewing port through the scalp 27 regardless of the position of the mirror head 16 along the support arms 14.

Figure 3A:
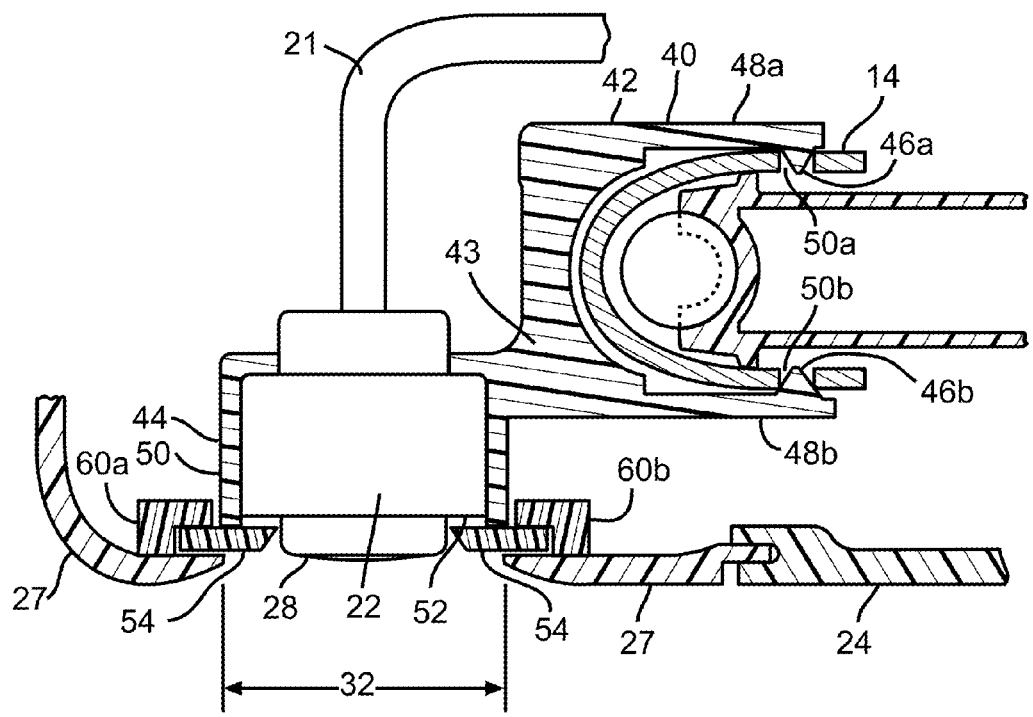
FIG. 3A is a cross-sectional view, taken along the line 3-3 of FIG. 2A, of a portion of the telescoping side view mirror assembly of FIG. 1.
Figure 4A:
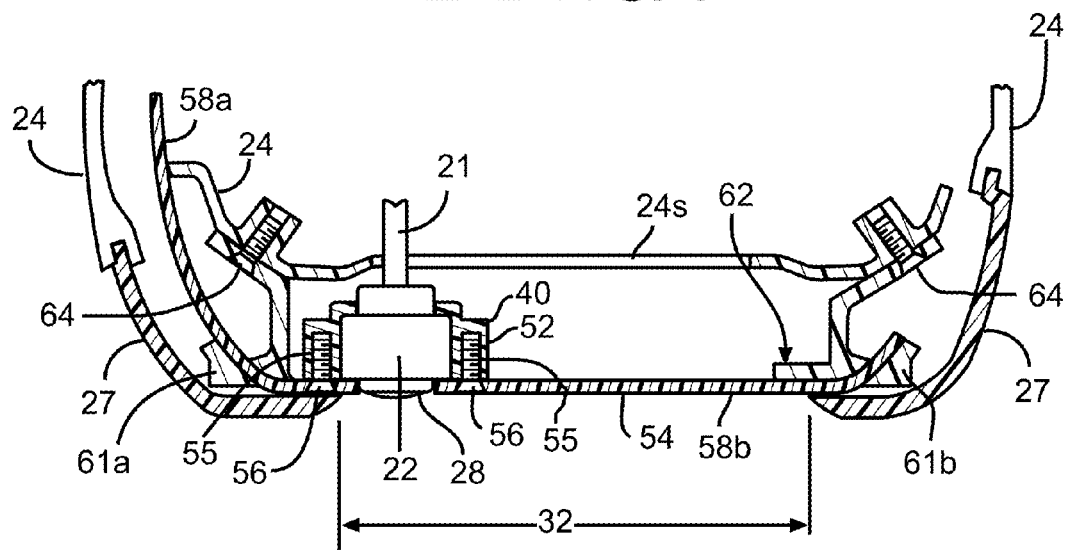
FIG. 4A is a cross-sectional view, taken along the line 4-4 of FIG. 2A, of a portion of the telescoping side view mirror assembly of FIG. 1.

Referring now to FIGS. 3A and 4A, portions of the camera 22, housing 24, scalp 27, lens 28, aperture 32 and a support arm 14 are illustrated. A camera holder 40 includes a first segment 42 configured for attachment to the support arm 14 and a second segment 44 configured to receive the camera 22. The first segment 42 and second segment 44 are joined by an intermediate portion, such as the neck portion 43. The first segment 42 includes snap nibs 46a and 46b positioned on opposing attachment arms 48a and 48b. The attachment arms 48a and 48b are configured to span the support arm 14 such that the snap nibs 46a and 46b engage and seat in opposing apertures 50a and 50b located on the support arm 14. Once the snap nibs 46a and 46b are seated in the apertures 50a and 50b, the camera holder 40 is fixed in position against the support arm 14. Accordingly, the camera holder 40 is stationary relative to the support arm 14 and does not move as the mirror head 16 moves in a telescoping manner along a length of the support arm 14.

While the embodiment of the mirror assembly 10 illustrated in FIGS. 3A and 4A show the camera holder 40 attached to the support arm 14 by use of snap nibs 46a and 46b, in other embodiments the camera holder 40 can be attached to the support arm 14 by other structures, mechanisms and devices, such as the non-limiting examples of threaded fasteners, adhesives, clips and clamps.

Figure 4B:
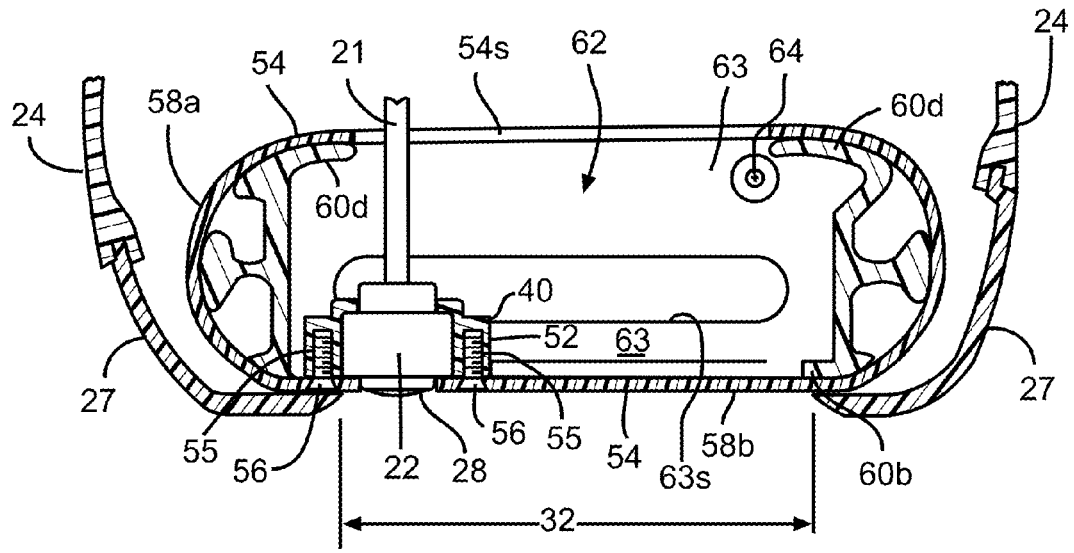
FIG. 4B is a cross-sectional view like FIG. 4A, taken along the line 4-4 of FIG. 2A but illustrating the alternative embodiment shown in FIG. 3B.

Referring now to FIGS. 3A and 4A, the second segment 44 of the camera holder 40 includes an annular boss 50. The annular boss 50 is configured to form a camera cavity 52. The camera cavity 52 is configured to receive the camera 22. The camera 22 may be retained in the camera cavity 52 by friction fit, fastener, adhesive or a flexible track 54. In the illustrated embodiment, the flexible track 54 is secured to the camera holder 40 by insertion of a plurality of threaded fasteners 56 into threaded apertures 55 (as shown in FIG. 4A, 4B). However, in other embodiments the flexible track 54 can be secured to the camera holder 40 by other structure, mechanisms and devices, including the non-limiting examples of snaps, clips and clamps.

Referring now to the embodiment of FIG. 4A, the flexible track 54 has a first portion 58a and a second portion 58b. The first and second portions 58a and 58b are configured to cover portions of the aperture 32 not engaged by the lens 28 of the camera 22 as the mirror head 16 moves along the support arms 14 (side to side as viewed in FIG. 4A). The mirror head 16 is shown in FIG. 4A in the extended position. In this position, the camera 22 is engaged with an inboard portion of the aperture 32 and the second portion 58b of the flexible track 54 covers the outboard portion of the aperture 32. In this manner, the second portion 58b of the flexible track 54 substantially protects the camera 22 from environmental elements, substantially blocks the camera 22 from wind noise and provides substantial continuity to the scalp 27 for an aesthetically pleasing appearance. While the camera 22 is engaged with the inboard portion of the aperture 32, the first portion 58a of the flexible track 54 extends between openings formed between portions of the housing 24 within the interior mirror head 16.

Referring still to FIG. 4A, in the alternative scenario where the mirror head 16 is in the retracted position, the camera 22 is engaged with an outboard portion of the aperture 32 and the first portion 58a of the flexible track 54 returns from the flexed position to cover the inboard portion of the aperture 32. While the camera 22 is engaged with the outboard position of the aperture 32, the second portion 58b of the flexible track 54 extends in a flexed manner between openings formed between portions of the housing 24 within the interior of mirror head 16.

Referring again to the embodiment shown in FIGS. 3A and 4A, the flexible track 54 is made from one or more flexible polymeric materials or films, such as for example polyurethane, polyethylene, including low density polyethylene (LDPE), polypropylene, and/or thermoplastic elastomer (TPE). Alternatively, the flexible track 54 can be made from other materials or other combinations of materials having sufficient flexibility and hardness (durometer) to allow portions of the track 54 alternatively to flex into the housing or to extend to provide a protective covering of the aperture 32.

Referring again to FIGS. 3A and 4A, opposing track guides 60a and 60b are attached to the interior of the mirror head 16 and move with the mirror head 16 as the mirror head 16 moves along the support arms 14. In this manner, the opposing track guides 60a and 60b form a channel configured to maintain the first and second portions 58a and 58b of the flexible track 54 in a slideable orientation relative to the mirror head 16. It will be appreciated that the track guides 60a and 60b may be part of a larger track guide assembly 62 that is secured to a portion of the mirror housing 24 or its scalp 27 by fasteners such as one or more screws 64. Bosses may be formed in the housing for this purpose, and slots such as 24s may be formed in housing 24 to accommodate the cables 21 or neck 43 as the mirror head 16 telescopes relative to the camera 22. The track guide assembly may include track guides bearing on an upper surface of flexible track 54, such as track guides 60a and 60b; or on a lower surface of flexible track 54, such as track guides 61a and 61b; or both.

Referring again to FIGS. 3A and 4A, in operation the housing 24, scalp 27 and track guides 60a and 60b move together as a single unit with the mirror head 16 as the mirror head 16 moves along portions of the support arms 14. The support arms 14, camera 22, camera holder 40 and track 54 do not move as the mirror head moves. Regardless of the position of the mirror head 16 along the support arms 14, the lens 28 of the camera 22 is configured to view through a portion of the aperture 32 and the remainder of the aperture 32 is covered by one or both of the first and second portions 58a and 58b of the flexible track 54.

Figure 3B:
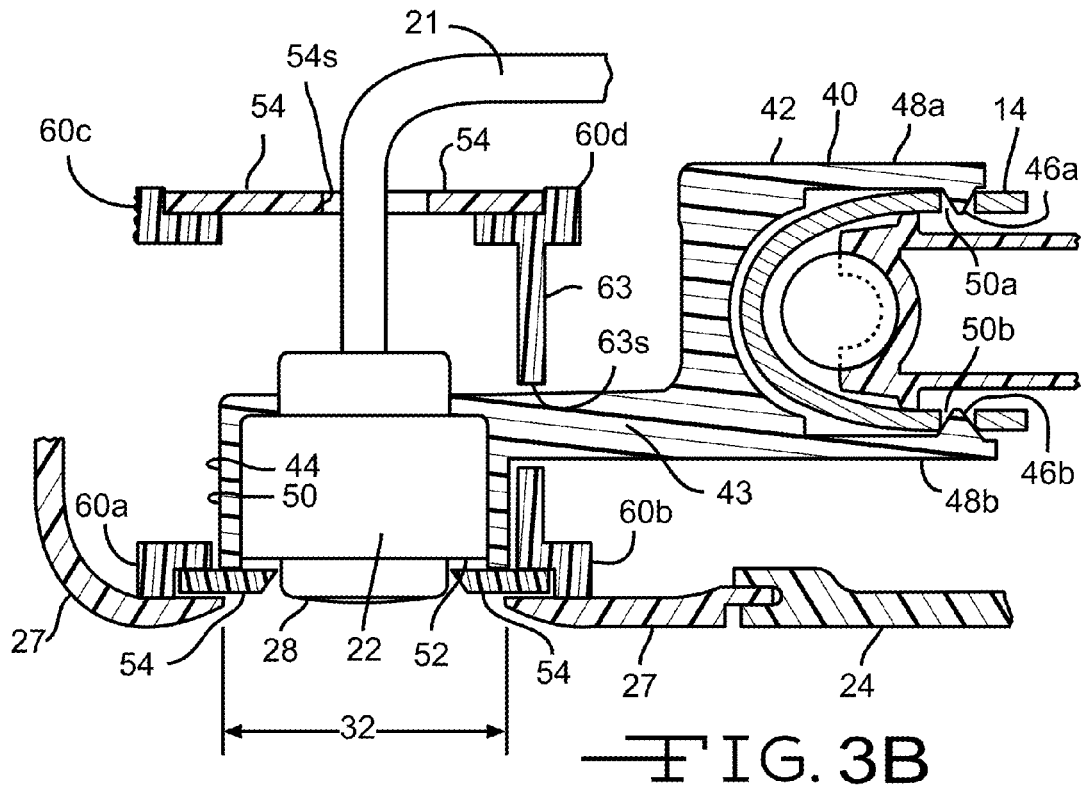
FIG. 3B is a cross-sectional view like FIG. 3A, taken along the line 3-3 of FIG. 2A but illustrating an alternative embodiment.

Referring now to FIGS. 3B and 4B, an alternate embodiment of the mirror assembly 10 is illustrated. Many portions of the base assembly 12, the support arms 14, mirror head 16, camera 22, lens 28, and aperture 32 are as described above in connection with FIGS. 3A and 4A. For example, camera holder 40 includes a first segment 42 configured for attachment to the support arm 14 and a second segment 44 configured to receive the camera 22. The first segment 42 and second segment 44 are joined by an intermediate portion, such as the neck or web 43 which, in this embodiment, may be more elongated than the neck or web 43 of FIG. 3A. Other portions are structurally and operatively substantially the same as in the embodiment previously described, such that the camera holder 40 is stationary relative to the support arm 14, mirror base 12 and vehicle 11, and the camera 22 does not move as the mirror head 16 moves in a telescoping manner along a length of the support arm 14 occupying any of infinite intermediate positions between and including a fully retracted position and a fully extended position.

Referring now to the alternate embodiment shown in FIG. 4B, the flexible track 54 is a continuous loop, having a first portion 58a and a second portion 58b, as before, but these are joined together to form a continuous band. A slot 54s may be formed in the back side of the band to allow power and signaling cables 21 to pass through the band 54. Alternatively, the cable(s) 21 may be diverted laterally to avoid having to pass through the band. When present, slot 54s does not extend to the first and second portions 58a and 58b which remain intact and attached to the camera housing 44. Consequently, portions 58a and 58b are able to cover portions of the elongated aperture 32 not engaged by the lens 28 of the camera 22 as the mirror head 16 moves along the support arms 14 (side to side as viewed in FIG. 4B).

As the mirror head 16 telescopes while the camera 22 remains stationary, the flexible track band 54 remains attached to the camera housing 44 and "rolls" within the housing 24, much like a tractor or tank tread. Multiple track guides 60a, 60b, 60c, 60d may be part of a larger track guide assembly 62 that maintains the flexible track band in proper orientation for "rolling" or sliding as the mirror head 16 telescopes relative to the fixed position of the camera 22. The internal track guides 60a, 60b, 60c and 60d may form a U-shaped channel in which the flexible track band 54 slides, and track guides at the two ends of the loop may be connected by a web or flange 63, which includes an elongated slot 63s through which the neck 43 protrudes, thus allowing the mirror head 16 to telescope back and forth while the camera 22 remains fixedly positioned on the support arm 14. Track guides bearing on an outer surface of flexible track 54 such as track guides 61a and 61b (see FIG. 4A) may also be employed, but are less important in the loop embodiment.

The track guide assembly 62 is secured to the housing 24 using fasteners such as screws 64. Bosses may be molded into the track guide assembly 62 or housing 24 for this purpose. Alternative fastening means, such as hooks, clips, welds, snap nibs, barbs and the like may be employed. In at least one variation, as illustrated in FIG. 4B, the flange 63 includes at least one aperture through which screw 64 secures the flange 63 of the track guide assembly 62 to a boss (not shown) extending from housing 24. More than one such fastener or fastener type may be used.

The mirror head 16 is shown in FIG. 4B in the extended position with the camera 22 engaged with an inboard portion of the aperture 32, and with the second portion 58b of the flexible track 54 being straightened out or "unrolled" to cover the outboard portion of the aperture. In this manner, the second portion 58b of the flexible track 54 substantially protects the camera 22 from environmental elements, substantially blocks the camera 22 from wind noise and provides substantial continuity to the scalp 27 for an aesthetically pleasing appearance, while the first portion 58a of the flexible track 54 rolls up around the track guide assembly 62 within the housing 24.

In the alternative scenario where the mirror head 16 telescopes to the retracted position, the camera 22 is engaged with an outboard portion of the aperture 32 and the first portion 58a of the flexible track 54 "unrolls" or straightens from the looped position to cover the inboard portion of the aperture 32, while the second portion 58b of the flexible track 54 "rolls up" around the track guide assembly 62 within the interior of mirror head 16.

Still referring to the embodiment shown in FIGS. 3B and 4B, the flexible track band 54 is made from one or more flexible polymeric materials or films, such as for example polyurethane, polyethylene, including low density polyethylene (LDPE), polypropylene, and/or thermoplastic elastomer (TPE). Alternatively, the flexible track 54 can be made from other materials or other combinations of materials having sufficient flexibility and hardness (durometer) to allow portions of the track 54 to alternatively "roll up" around the track guide and straighten or "unroll" to provide a protective covering of the aperture 32.

The principle and mode of operation of the side view mirror assembly with a stationary camera and telescoping mirror head has been described in certain embodiments. However, it should be noted that the side view mirror assembly with a stationary camera and telescoping mirror head may be practiced otherwise than as specifically illustrated and described without departing from its scope.

What is claimed is:

1. A side mirror assembly comprising:
   one or more support arms attached to and extending from a mirror base assembly configured for attachment to a portion of a vehicle;
   a mirror head slidably attached to the one or more support arms such that the mirror head can telescope relative to the mirror base; and
   a camera positioned within the mirror head and disposed in a camera holder that is attached to an outside surface of the one or more support arms, the camera configured to provide images exterior to the vehicle, wherein the camera is configured to remain in a stationary position relative to the mirror base as the mirror head telescopes.

2. The side mirror of claim 1, wherein the camera is positioned to view downwardly from a bottom of the mirror head.

3. The side mirror of claim 1, wherein the mirror head has an aperture configured to provide a viewing port for a lens of the camera regardless of the telescoped position of the mirror head.

4. The side mirror of claim 3, wherein the aperture is an elongated aperture and the mirror head further comprises a flexible track configured to cover a portion of the elongated aperture adjacent the camera lens regardless of the telescoped position of the mirror head.

5. The side mirror of claim 4, wherein the aperture has a first end and a second end and wherein the first end is covered by a portion of the flexible track when the lens viewing port is at the second end, and wherein the second end is covered by a portion of the flexible track when the lens viewing port is at the first end.

6. The side mirror of claim 4, wherein the flexible track is guided by opposing track guides.

7. The side mirror of claim 4, wherein a portion of the flexible track is configured to flex within the mirror head.

8. The side mirror of claim 4, wherein the flexible track forms a continuous band within the mirror head.

9. The side mirror of claim 8, further comprising a track guide assembly having track guides that retain the flexible track in a loop within the housing.

10. The side mirror of claim 1, wherein the mirror head is configured to telescope along a portion of the support arms between a retracted position and an extended position.

11. A vehicle having a side mirror assembly, the side mirror assembly comprising:
    a mirror base assembly configured for attachment to a portion of a vehicle;
    one or more support arms attached to and extending from the mirror base assembly;
    a mirror head slidably attached to the one or more support arms such that the mirror head can telescope relative to the vehicle; and
    a camera positioned within the mirror head and disposed in a camera holder that is attached to an outside surface of the one or more support arms, the camera configured to provide images exterior to the vehicle, wherein the camera is configured to remain in a stationary position relative to the side of the vehicle as the mirror head telescopes relative to the vehicle.

12. The vehicle of claim 11, wherein the mirror head has a housing having an elongated aperture configured to provide a viewing port for a lens of the camera regardless of the telescoped position of the mirror head.

13. The vehicle of claim 12, wherein the housing includes a track guide assembly for maintaining a flexible track covering portions of the elongated aperture adjacent to the camera lens regardless of the telescoped position of the mirror head.

14. The vehicle of claim 12, wherein the mirror head is configured to telescope along a portion of the support arms between an inboard retracted position and an outboard extended position.

15. A side mirror assembly comprising:
    one or more support arms attached to and extending from a base assembly configured for attachment to a portion of a vehicle;
    a mirror head slidably engaging the one or more support arms such that the mirror head can telescope relative to the base assembly between a retracted position and an extended position, the mirror head further defining an elongated aperture aligned substantially parallel to an axis of telescoping;
    a camera positioned within the mirror head and attached to one of the support arms such that the camera remains in a stationary position relative to the base assembly as the mirror head telescopes between the retracted and extended positions, the camera having a lens configured to provide images exterior to the vehicle through the elongated aperture; and
    a flexible track configured to remain stationary relative to the camera as the mirror head telescopes and having first and second portions disposed on opposite sides of the camera lens the first and second portions configured to cover an opening of the elongated aperture adjacent the camera lens regardless of the retracted or extended position of the telescoping mirror head.

16. The side mirror assembly of claim 15, wherein a first portion of the flexible track covers an outboard portion of the elongated aperture when the mirror head is in the extended position, and a second portion of the flexible track covers an inboard portion of the elongated aperture when the mirror head is in the retracted position.

17. The side mirror assembly of claim 15, wherein the flexible track forms a continuous band within the mirror head.

18. The side mirror assembly of claim 17, further comprising a track guide assembly having track guides that retain the flexible track in a loop within the housing.

19. A side mirror assembly comprising:
    one or more support arms attached to and extending from a base assembly configured for attachment to a portion of a vehicle;

a mirror head slidably engaging the one or more support arms such that the mirror head can telescope relative to the base assembly between a retracted position and an extended position, the mirror head further defining an elongated aperture aligned substantially parallel to an axis of telescoping;

a camera positioned within the mirror head and attached to one of the support arms such that the camera remains in a stationary position relative to the base assembly as the mirror head telescopes between the retracted and extended positions, the camera having a lens configured to provide images exterior to the vehicle through the elongated aperture; and a flexible track fixed to the camera and configured as a continuous band having first and second portions disposed on opposite sides of the camera lens the first and second portions configured to cover an opening of the elongated aperture adjacent the camera lens regardless of the retracted or extended position of the telescoping mirror head.

20. The side mirror assembly of claim 19, further comprising a track guide assembly having track guides that retain the flexible track band in a continuous loop within the housing.

* * * * *